UNITED STATES PATENT OFFICE

2,594,374

STREPTOMYCIN-POLYMYXIN-BACITRACIN COMPOSITION

Henry Welch, Silver Spring, Md., assignor to the United States of America

No Drawing. Application October 11, 1949, Serial No. 120,811

3 Claims. (Cl. 167—55)

(Granted under the act of March 3, 1883, as amended April 30, 1928; 370 O. G. 757)

The present invention relates to a pharmaceutical composition and more especially to a composition which is particularly adapted to pre-operative and post-operative treatment of patients prior to and following abdominal surgery, since it markedly reduces the number of bacteria in the intestinal tract. Because of its bactericidal and bacteriostatic activity, this pharmaceutical composition is also adapted to the treatment of a wide variety of infections of the intestinal tract.

Various antibacterial preparations have been employed in abdominal surgery and for the treatment of infections of the intestinal tract. Streptomycin has been used, but it is ineffective against anerobic organisms and many Gram-negative organisms develop resistance to this drug rapidly and although initially the intestinal bacterial content is reduced, within a matter of two to three days the bacterial flora has been replaced by organisms resistant to the drug. This is especially true of the coliform type of bacteria. (Ref. Herfort, R. A., and Standard, Samuel: Annals of Surgery, 2854:128:1948.)

Penicillin has been used in an attempt to destroy bacteria in the intestinal tract but it is effective only against Gram-positive organisms, and as a matter of fact is inactivated by enzymes produced by Gram-negative organisms. Hence it has not been found to be very successful in reducing the intestinal bacterial flora.

Polymyxin has been used with some success for suppressing intestinal bacteria, but its bacterial spectrum is not sufficiently broad to bring about a marked reduction in the total bacterial flora.

Aureomycin has not been found satisfactory as an intestinal antiseptic since it appears to be less effective than either streptomycin or the sulfonamides. (Ref. Pulaski, Edwin J.: Bulletin of U. S. Army Medicine, 9:49.) The latter drugs have been used extensively as intestinal antibacterial agents also, but their action is highly selective. (Ref. Ravdin, I. S., Zintel, H. A., and Bender, D. H.: Annals of Surgery, 126:1947.)

The combination of streptomycin and glucuronolactone has been used to "sterilize" the intestinal tract with considerably more success than streptomycin alone, but this combination does not suppress the clostridia or bacteroides and, in addition, following treatment resistant strains of coliform organisms can be demonstrated in fecal specimens. (Ref. Pulaski, E. J.: Bulletin of U. S. Army Medicine, 9:49.)

In accordance with this invention I have discovered that by combining streptomycin, polymyxin, and bacitracin there is obtained a composition which, according to clinical and bacteriological tests, approaches the ideal compound for reducing the bacterial flora of the intestinal tract. This composition has an important advantage over others proposed in that it provides not only a rapid reduction in the intestinal bacteria, but is successful in maintaining a markedly reduced bacterial count in the intestinal tract over long periods of time.

The composition may be made in a liquid or dry form. In addition to the active ingredients of the composition, I may use various inert solids, particularly when the composition is made in the dry form.

The composition may be conveniently used in the form of tablets or capsules, or it may be suspended in liquid form in a menstruum of flavored gelatin. The tablets may be prepared by mixing the active ingredients (streptomycin, polymyxin, and bacitracin) with excipients such as lactose, talc, cornstarch, binders, lubricants (calcium stearate) and, if necessary, flavoring oils such as methyl salicylate.

The tablet may be prepared by processes well known in the pharmaceutical industry such as by "slugging" or by a wet granulation process. The tablet made by the dry granulation process has the following composition:

*Per tablet*

| | | |
|---|---|---|
| Streptomycin | milligrams | 250 |
| Polymyxin | do | 20 |
| Bacitracin | units | 5,000 |
| Inert materials including excipients, binders, and lubricants, q. s. to | grams | 0.5 |

The capsules are prepared without excipients, lubricants and binders but by using the above formula with the active ingredients (streptomycin, polymyxin, bacitracin) enclosed in a hard gelatin capsule of proper size.

The composition can be prepared by dissolving in water 3 grams of streptomycin, 240 milligrams of polymyxin, and 60,000 units of bacitracin with one box of commercially available cherry Jello. The latter preparation was the first one utilized in clinical studies and the cherry Jello was chosen because of its ability to neutralize the taste of the antibiotics, two of which (bacitracin and polymyxin) are extremely unpalatable.

The proportions of the various ingredients in my composition may be varied widely provided the patient is given the proper dosage of the finished capsule, tablet, or Jello mixture. Thus, in the case of the tablets, satisfactory results are obtained by giving the patient two tablets twice daily and, similarly, in the case of the capsules, two capsules twice daily. In the case of the Jello mixture, the patient is directed to divide the Jello prepared from the single box into six equal portions and to take one portion twice daily. The amount of antibiotics in the tablets and capsules is governed primarily by the size of the tablet or capsule.

In the composition where reference is made to streptomycin is meant each of the several antibiotic substances produced by the growth of *Streptomyces griseus* including dihydrostreptomycin. Where reference is made to polymyxin is meant each of the several antibiotic substances produced by the growth of *Bacillus polymyxa*. Similarly, where reference is made to bacitracin is meant each of the several antibiotic substances produced by the growth of *Bacillus subtilis* var. Tracy.

The effect of this streptomycin, polymyxin, bacitracin composition on the intestinal bacterial flora of man was determined, using six normal adult males. At the same time another pharmaceutical preparation called glucomycin was tested for comparison in the same number of subjects. Glucomycin is a mixture of streptomycin and glucuronolactone, and is said to overcome the deficiencies of streptomycin in that the coliform portion of the intestinal flora does not return to its former number under treatment even though when treatment is discontinued and the coliform count returns to normal the organisms are found to be highly resistant to streptomycin. As a further control and to show the additive effect of the composition over polymyxin alone, another group of six volunteers was treated with polymyxin. Neither bacitracin nor streptomycin was tested in this study since the former, when used alone, has been shown to cause the development of resistant strains of bacteria in the intestinal tract and the latter (bacitracin) is active against only the Gram-positive type of organisms.

The daily dose of glucomycin was twenty (20) one-half gram tablets, a total of two grams of streptomycin and eight grams of glucuronolactone. The daily dose of polymyxin was one (1) one hundred milligram tablet while the daily dose of streptomycin-bacitracin-polymyxin composition was four tablets, a total of one gram of streptomycin, twenty thousand units of bacitracin and eighty milligrams of polymyxin.

The effect on the intestinal bacterial flora in each volunteer was determined by first obtaining the control bacterial counts followed by administering the appropriate material for a period of ten days and studying the bacterial flora in daily fecal specimens. The treatment schedule was then discontinued for eight days to allow the intestinal bacterial flora to return to normal, then the treatment schedule was started again and continued for six days to determine whether the first regimen had resulted in resistant bacterial types which would fail to respond to a second course of the same therapeutic agent. In numerous investigations of this type reported in the literature, the coliform organisms have been used as an index of the effect of antibacterial agents on the intestinal flora of man. These organisms are usually involved directly in infections following abdominal surgery and not infrequently are associated with gastro-intestinal pathology. (Ref. Bulletin, Johns Hopkins Hospital 71:213–234 (1942).) Consequently, the coliform organisms were chosen to study the comparative effectiveness of the three preparations. The results are illustrated in the table.

Table.—*Bacterial counts showing the comparative effect of glucomycin, polymyxin and streptomycin-polymyxin-bacitracin composition on coliform bacteria in the intestinal tract of 18 human male volunteers*

| Date | Treatment | Numbers of Coliform Bacteria per Gm. of Wet Stool | | |
|---|---|---|---|---|
| | | Glucomycin | Polymyxin | Streptomycin-Polymyxin-Bacitracin Composition |
| 8-19 | Control (no drug) | 350,000,000 | 350,000,000 | 350,000,000 |
| 8-20 | Drug given | 36,600,000 | 2,430,000 | 2,170,000 |
| 8-21 | ----do---- | 186,000 | 4,000,000 | ¹ 200 |
| 8-22 | ----do---- | ¹ 160 | 2,000,000 | ¹ 160 |
| 8-23 to 8-29 | ----do---- | ¹ 23 | 567,000 | ¹ 50 |
| 8-30 | No drug | ¹ 2 | 3,700,000 | 0 |
| 8-31 | ----do---- | 0 | 3,700,000 | 0 |
| 9-1 | ----do---- | 3,600 | 16,700,000 | 0 |
| 9-2 to 9-6 | ----do---- | 49,200,000 | 53,000,000 | 50,000,000 |
| 9-7 | Drug given | 24,020,000 | 37,000,000 | 840,000 |
| 9-8 | ----do---- | 2,000,000 | 20,000,000 | ¹ 70 |
| 9-9 | ----do---- | 2,020,000 | 2,200,000 | ¹ 20 |
| 9-10 | ----do---- | 0 | 1,700,000 | 0 |
| 9-11 | ----do---- | 0 | 1,700,000 | 0 |
| 9-12 | ----do---- | 0 | 40,000 | 0 |
| 9-13 to 9-15 | No drug | 5,625 | 2,150,000 | 1,750,000 |

¹ Five of the six patients treated showed absence of coliform bacteria.

Dose given:
   Glucomycin: twenty 0.5 gm. tablets daily (2.0 gm. streptomycin, 8.0 gm. glucuronalactone)
   Streptomycin-polymyxin-bacitracin composition: four 0.5 gm. tablets (1.0 gm. streptomycin, 80 mg. polymyxin, 40,000 units bacitracin) daily
   Polymyxin: one 100 mg. tablet daily Inspection of the table shows that both the glucomycin and the streptomycin-bacitracin-polymyxin composition resulted during therapy in a reduction of the coliform organisms to zero. The streptomycin-bacitracin-polymyxin composition, however, resulted in a more rapid reduction of the coliform count. It should be noted that the streptomycin content of the composition was only one-half as much as that in the glucomycin. Thus the more than additive effect of the composition of the three drugs is apparent. This increased effectiveness of the composition is evident once again when the second dosage schedule was instituted (9–7). The count with the streptomycin-bacitracin-polymyxin composition fell from 50,000,000 to less than one million in one day, and was essentially zero by the second day. With glucomycin the drop was much slower, the count on the first day remaining 24,000,000 with 2,000,000 coliforms present on the second and third days; complete eradication of the coliform organisms occurring only after the fourth day of treatment.

The administration of polymyxin alone resulted in a marked lowering of the coliform bacteria in the intestinal tract, but at no time during the course of therapy did it effect a complete removal of the coliform organisms. It should also be noted that the coliform count has a tendency to increase even during the administration of polymyxin.

In addition to the effect of these three preparations on the coliform bacteria, studies were made with the 18 male volunteers of the fecal streptococci, the heat resistant organisms (stools treated at 80° C. for 30 minutes) and the total count of each stool specimen. In general, the reduction in numbers of organisms followed a pattern similar to that obtained with the coliform bacteria. It should be noted that as the bacterial flora was eliminated, yeasts appeared in the stools following the treatment with all three preparations and total counts of microorganisms were thereby increased.

Following the demonstration that the streptomycin-polymyxin-bacitracin composition would markedly reduce the number of bacteria in the gastrointestinal tract, and especially the Gram-negative coliform bacteria, it was used in the treatment of ten cases of gastro-intestinal dysfunction. In nine of these ten cases a specific etiologic agent was not isolated. The tenth case was diagnosed as amoebic dysentery. Amoebic dysentery is a disease in which the causative organism *Endamoeba histolytica* is relatively unaffected by the three antibiotics of the composition. However, the intestinal lesions caused initially by the amoeba are markedly aggravated by secondary infections caused by bacteria normally present in the intestinal tract. Thus, from this standpoint the streptomycin-polymyxin-bacitracin composition relieves the symptoms of amoebic dysentery and aids in the cure of the disease. Furthermore, since *Endamoeba histolytica* utilizes certain bacteria of the intestinal tract for food, the reduction in the total number of bacteria reduces the food supply necessary for the growth of the amoeba and helps in their eradication. The chief complaint in all ten cases was persistent diarrhea, with secondary systems of a varied nature, such as abdominal pain, anorexia, and loss of weight. It is generally recognized that in the majority of cases presenting the above symptoms a specific etiologic agent is not usually identified. The opinion is that in such cases bacteria which are normal inhabitants of the intestinal tract cause irritation of the gut resulting in the above mentioned symptoms. Since the precise causative organism is not known in most of these cases the antibiotic composition herein described is designed to eliminate or suppress the greatest number of the bacterial species normally present in the gastrointestinal tract. However, this antibiotic composition is also active against many known intestinal pathogens, such as the causative organisms of typhoid fever, paratyphoid fever, and bacillary dysentery.

The dosage used was the same in all cases. The drugs were administered either as a compressed tablet, in capsules, or the separate antibiotics were incorporated in a cherry flavored gelatin preparation. In any case, the total daily dose of the antibiotic composition was streptomycin, 1 gram; bacitracin, 20,000 units; and polymyxin, 80 milligrams. This total dose was administered orally in two or three subdivisions daily for various time periods, usually one to two weeks. Two illustrative case histories are appended.

Case #1.—Mrs. M. K., aged 37, had had diarrhea and abdominal pain and tenderness for the past five years. Previous medication consisted of codeine sulfate, paregoric, and various other antibacterial drugs which alleviated the symptoms but failed to effect complete relief or to cure the condition. The patient was given the streptomycin-polymyxin-bacitracin composition, two capsules after each meal for a total of 24 capsules. Forty-eight hours after the patient was given the drug the pain, soreness, and diarrhea had disappeared. This was the first time in five years that this patient had been free of symptoms. She has remained well to date. No toxic effects from the antibiotic composition were noted.

Case #2.—Mr. E. P., Jr., had had chronic diarrhea, anemia, low abdominal pain, and loss of body weight and vigor. Roentgenological examination of the colon showed a pathologic picture consistent with a diagnosis of chronic ulcerative colitis. Previous medication consisted of streptomycin, rest, iron, and vitamins. The onset of his condition was October, 1946, while he was serving in the Navy in the South Pacific, and he was finally discharged because of his disease. This patient was given the antibiotic composition for one month. While under treatment his condition improved, and finally he became symptom free. No toxic effects were noted.

The invention described herein may be manufactured and used anywhere by or for the Government of the United States for governmental purposes without the payment to me of any royalty thereon in accordance with the provisions of the act of April 30, 1928 (ch. 460, 45 Stat. L. 467).

I claim:

1. A therapeutic antibiotic composition for oral administration composed of streptomycin, polymyxin, and bacitracin, said composition being capable of substantially suppressing coliform bacteria in the intestinal tract without substantial adverse effects.

2. A therapeutic antibiotic composition for oral administration composed of streptomycin, polymyxin, and bacitracin in the following proportions: streptomycin, 250 milligrams; polymyxin, 20 milligrams; bacitracin, 85 milligrams.

3. A therapeutic antibiotic composition for oral administration composed of 250 milligrams of streptomycin, 20 milligrams of polymyxin, and 5000 units of bacitracin.

HENRY WELCH.

REFERENCES CITED

The following references are of record in the file of this patent:

UNITED STATES PATENTS

| Number | Name | Date |
|---|---|---|
| 2,544,630 | Hegarty et al. | Mar. 6, 1951 |

OTHER REFERENCES

Amer. J. of Public Health, March 1949, pages 340 to 344. 167–65P–1.

The Amer. Jour. of Pharm., November 1948, pages 429 to 443. 167–65P–1.

Jour. Am. Med. Assn., volume 141, December 24, 1949, page 1226. 167–65P–2.

Jour. Amer. Pharm. Assn. (Sci. Ed.), November 1945, pages 286 to 291. 167–65P–2.